United States Patent [19]

Roentgen et al.

[11] Patent Number: 4,555,607

[45] Date of Patent: Nov. 26, 1985

[54] PROCESS FOR INSTALLATION AND REMOVAL OF GLASS PANE FROM A FRAME

[76] Inventors: Paul Roentgen, Talweg 7, D-5106 Roetgen/Rott; Helmut Krumm Lohmühlenstrasse 2, D-5100 Aachen; Gottfried Krasborn, Bismarckstrasse 12, D-5100 Aachen; Günter Lenzen, Teichwinkel 14, D-5100 Aachen, all of Fed. Rep. of Germany

[21] Appl. No.: 616,026

[22] Filed: Jun. 1, 1984

Related U.S. Application Data

[63] Continuation of Ser. No. 384,939, Jun. 4, 1982, abandoned.

[30] Foreign Application Priority Data

Jun. 19, 1981 [DE] Fed. Rep. of Germany ....... 3124138

[51] Int. Cl.[4] ............................................. H05B 6/64
[52] U.S. Cl. ............................... 219/10.57; 219/10.41; 219/10.43; 219/10.81; 219/10.53; 156/273.9
[58] Field of Search ............... 219/10.57, 10.41, 10.43, 219/10.81, 10.53; 156/107, 274.8, 273.9, 344

[56] References Cited

U.S. PATENT DOCUMENTS

| 3,049,465 | 8/1962 | Wilkins | 156/273.9 |
| 4,110,148 | 8/1978 | Rocholl | 219/10.57 |
| 4,184,000 | 1/1980 | Denman | 156/273.9 |

FOREIGN PATENT DOCUMENTS

| 1253083 | 10/1967 | Fed. Rep. of Germany . |
| 1630371 | 4/1971 | Fed. Rep. of Germany . |

Primary Examiner—C. L. Albritton
Assistant Examiner—Marian M. Lateef
Attorney, Agent, or Firm—Pennie & Edmonds

[57] ABSTRACT

The invention is in a glass pane including a conductive strip around or substantially around its marginal edge. The conductive strip when included in circuit to a source of power may be heated for treating a strand of adhesive comprising an adhering medium between the glass pane and a frame thereby to enable both installation of the glass pane in the frame and permit removal of the glass pane from the frame with relative ease.

11 Claims, 7 Drawing Figures

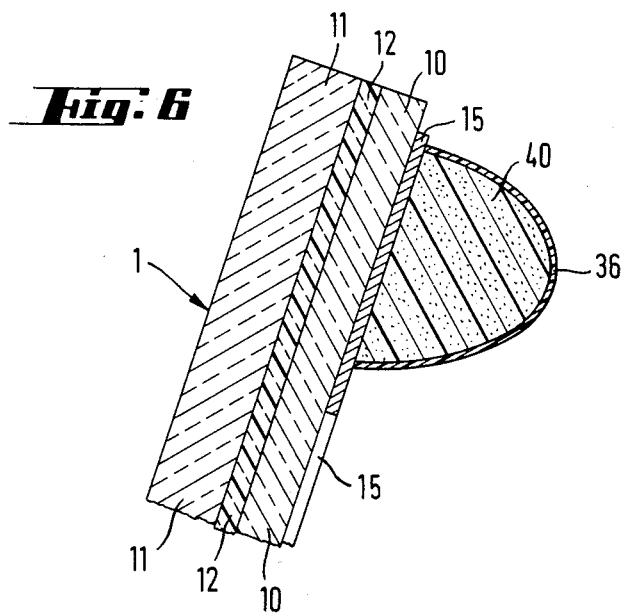
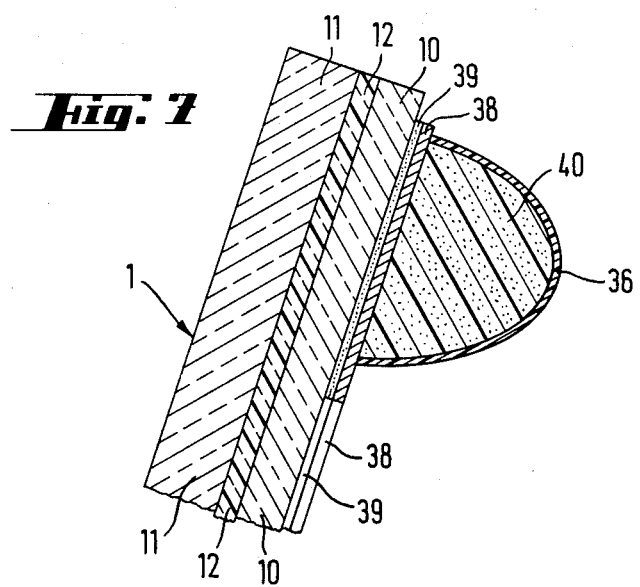

PROCESS FOR INSTALLATION AND REMOVAL OF GLASS PANE FROM A FRAME

CROSS REFERENCE TO RELATED APPLICATIONS

This application is a continuation of application Ser. No. 384,939, filed June 4, 1982, which is now abandoned.

TECHNICAL FIELD

The invention relates to a process for installation, and sealing, of a glass pane in a frame and the removal of the glass pane from its sealing relationship. The invention also relates to a glass pane for carrying out the process.

The invention has substantially universal utility and one preferred use of the process is in the automotive industry wherein the glass pane may comprise a windshield.

BACKGROUND ART

Representative examples of the prior art include German Auslegeschrift No. 1253083 and German Offenlegungsschrift No. 1630371.

The first publication discloses a process for the installation of a windshield within an opening disposed in the body of a vehicle. According to the publication and the described process, the windshield is installed on the body of the vehicle through use of a strip of an initially soft, hardenable working material. The material is disposed on the body of the vehicle about and parallel to the edge of the windshield, itself, or the windshield opening. A particular aspect of the described process concerns the use of an electrical conductor which extends through the body of the strip. The electric conductor, providing a path of current when connected to an electric power source, is used to heat the working material forming the strip when the windshield is in place transforming the working material to the hardened state for securement of the windshield.

A particular disadvantage of a process as described above resides in the fact that it is limited substantially to the installation of a windshield within an opening disposed in the body of a vehicle. As such, the process as typified by the prior art necessitates both a high labor consuming and time consuming effort in the disassembly of a substantially cemented in windshield in the event, for example, that the windshield is damaged.

The second publication referred to above, is somewhat similar to the first publication. To this end, the publication discloses the use of a strip with a thermoplastic adhesive adapted to be plasticized by heat from a resistance wire connected across an electric current source. The resistance wire, likewise, is embedded within the thermoplastic adhesive.

Both of the prior art suffers various problems and disadvantages founded upon the use of specially prepared adhesive strips. In addition to the increased cost in fabricating the specially prepared strip, the strip having an embedded conductor, such as a resistance wire often gives rise to a problem of locating and separating the ends of the electrical conductor during installation. The problem of accessibility to the ends of the electrical conductor is even more acute following installation and following movement of the adhesive. Thus, it is often not possible to use the electrical conductor in the process of disassembly, if the windshield is capable of disassembly with heat. Further, the electrical conductor must be subject to high current flow to provide heat to the adhesive surfaces in sufficient amount to plasticize or harden the material described in these prior art publications.

SUMMARY OF THE INVENTION

The invention seeks to overcome the aforenoted problems and disadvantages of the prior art, and there is disclosed an improved process for installation and removal of a glass pane from a frame, as well as a glass pane for carrying out the process. The process provides for a relatively easy, uncomplicated installation of a glass pane and a relatively less labor and time consuming removal of the glass pane from the frame in the event of damage requiring replacement or for any other reason. Furthermore, the process of the invention is one that may be carried out without the requirement of specially fabricated adhesive strips. Conventional plastic adhesives and conventional adhesive strips are utilized in the process of the invention.

According to the process, plastic adhesive is disposed either on the body of the vehicle, in the region of the frame, around the opening in the body, or on the glass pane itself and ultimately disposed between the glass pane and the frame. More particularly, a strip of material may be disposed along the marginal edge of the glass pane between the surface of the glass and the plastic adhesive, and in direct contact with the latter. The strip is a conductive strip, adapted for connection to a current source, and when so connected capable of direct heating of the plastic adhesive during installation and removal of the glass pane from the frame. By direct heating, less heat will be required to heat the plastic adhesive, and the heat is provided at the necessary location for carrying out the invention.

The conductive strip may be applied to the glass pane during production in a manner, for example, according to known processes in the production of electrically heatable windows. This will be discussed more fully as the description continues.

In the case of a glass pane comprising a safety glass windshield for a vehicle, it is envisioned that the conductive strip may be disposed along the marginal edge on either side of the glass pane toward the passenger compartment. Thus, it is possible to accommodate the use of a plastic adhesive that will adhere better to a glass surface than to the surface of a conductive material.

As indicated, the process of the invention is particularly suited for removal or disassembly of the glass pane (a term intended to encompass a windshield) fastened to the frame, and a glass pane fastened to the frame with an adhesive having no thermoplastic characteristics. In the latter case, disassembly of the glass pane may be carried out by heating the conductive strip at a higher voltage or a higher current level than for installation thereby to heat and decompose the adhesive. The adhesive, thus, loses its adhesion capability.

While the conductive strip may be heated directly, it is a further aspect of the invention to provide that the conductive strip comprise one electrode of a circuit, while the frame to which the glass pane is mounted comprises the other electrode of the circuit. The electrodes are connected to a voltage source of high frequency whereby the adhesive is heated dielectrically. Furthermore, the adhesive is heated uniformly throughout its cross section and throughout all critical areas of the adhesive connection.

A current connecting element, preferably a pair of or more flexible wires each serving as a connector, is carried by the conductive strip along the marginal edge of the glass pane. The current connecting element may comprise a pair of flexible wires, each of which serve as a connector, or the current connecting element may comprise more than a pair of flexible wires which likewise serve as a connector. A pair of wires normally will be adequate for use with a glass pane, such as a windshield of customary size. If the conductive strip extends completely about the margin of the glass pane, the wires preferably are disposed opposite one another on the shorter sides of the glass pane, and in position so that the conductive paths are substantially equal. If the conductive strip extends only substantially completely about the margin edge thereby to provide a gap or interruption, the wires are located at the ends of the conductive strip.

In a further aspect of the invention, the adhesive material may be disposed in an extruded strand directly atop the conductive strip carried by the glass pane. This combination of structure may be produced at the production plant. To render or facilitate the structure for handling and transportation the adhesive may be covered by a protective foil that is removed easily prior to installation of the glass pane.

These details and other details and advantages of the invention will become more clear as the description of the preferred illustrated embodiments continues.

BRIEF DESCRIPTION OF THE DRAWING

FIG. 6 is an enlarged view in section of an adhesive string on a guide strip as illustrated in FIGS. 3 and 5; and FIG. 7 is a view similar to FIG. 6, yet illustrating the guide strip juxtaposed to an adhesive layer.

BEST MODE FOR CARRYING OUT THE INVENTION

Figure 1:
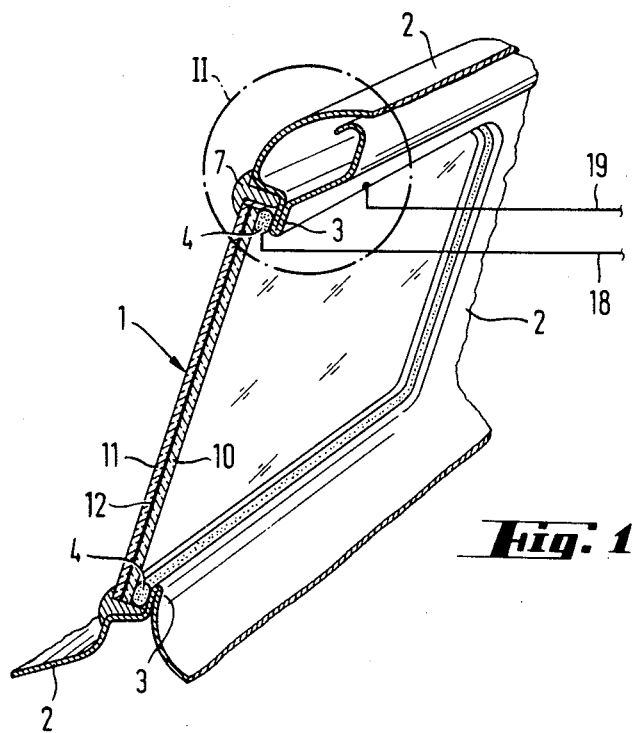
FIG. 1 is a broken away perspective view, partially in section, of the body of a vehicle, an opening and a windshield within the opening.

The invention is directed to a process for mounting a glass pane within an opening, and withdrawing the glass pane, previously mounted, in the event of damage or for any other reason requiring disassembly. Overall, the invention may be used in many fields, such as building construction, and in the automotive industry. The disclosure is specific to the latter field, but the more universal use will be readily apparent.

The glass pane 1 serves as a window for a vehicle and may be characterized as a windshield. The windshield, except as will be discussed in detail, may be considered to be conventional in both its makeup and fabrication. To this end, the windshield is of laminated safety glass construction formed by a pair of outer panes 10, 11 and an interlayer 12 formed of a thermoplastic material, such as polyvinyl butyral. As may be seen in the Figures, pane 10 is the inside pane, while the pane 11 is the outside pane.

In the automotive adaptation, the windshield is received by the body 2 of the vehicle thereby to close an opening framed by a rabbet 3 (see FIG. 1 and the enlargement of FIG. 2), the surface of which provides a stop. As an important aspect of the invention, the windshield is sealed in the opening, yet the windshield may be withdrawn easily from the sealed mounting in a manner to be described.

Figure 2:
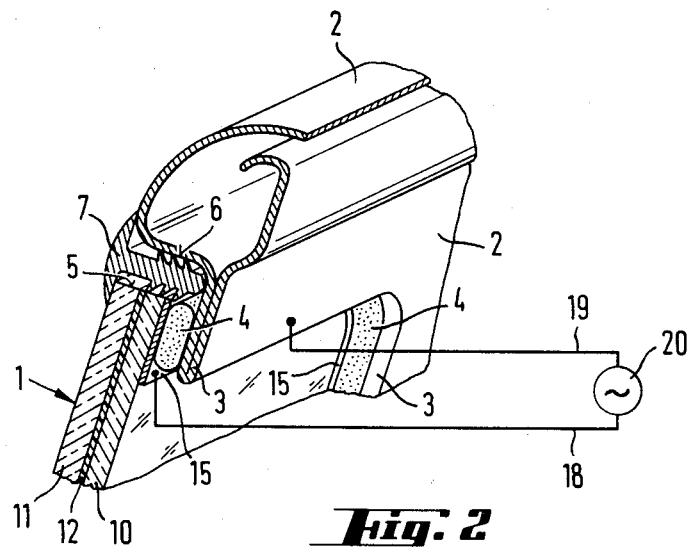
FIG. 2 is an enlarged view of a portion of FIG. 1, providing further detail, and illustrating a power source in circuit connection.

A strand 4 of an adhesive material, see FIGS. 1 and 2, is disposed on the surface of the rabbet toward the outside of the vehicle in position juxtaposed to the marginal edge of the glass pane. The strand extends completely about the opening and is deformed generally from a circular cross section to one of oval outline under pressure as the glass pane is moved to a position toward the surface of rabbet 3.

As previously stated, and as will be further discussed in connection with a decription of FIGS. 6 and 7, the strand may be disposed on the surface of the glass pane equally as well, without any overall change in function.

The deformation of the strand 4 is such to adapt itself to the curvatures of the two surfaces, that is, the surface of rabbet 3 and glass pane 1, that are to be adhered together in a tight sealing relationship.

A strip 7 of generally T-shaped cross section is received in the space between each edge 5 of the glass panel 1 and the surface 6 of the opening framed by rabbet 3. The strip is decorative in nature and may include, for example, a chrome-plated, rounded head portion extending between the body 2 and glass 1 to close the space to the outside. A plurality of ribs on a shank portion assist in securing the strip in position.

The strand 4 which preferably is extruded into position may comprise substantially any adhesive material including, but not limited to, thermoplastic materials, such as butyl rubber, and permanently plastic or hardenable materials. The criteria for choice is that the material provide sufficient adhesive force, that it display sufficient flow characteristics at ambient temperature and that no special measure need be taken for plasticizing the adhesive in the installation of glass pane 1.

Figure 3:
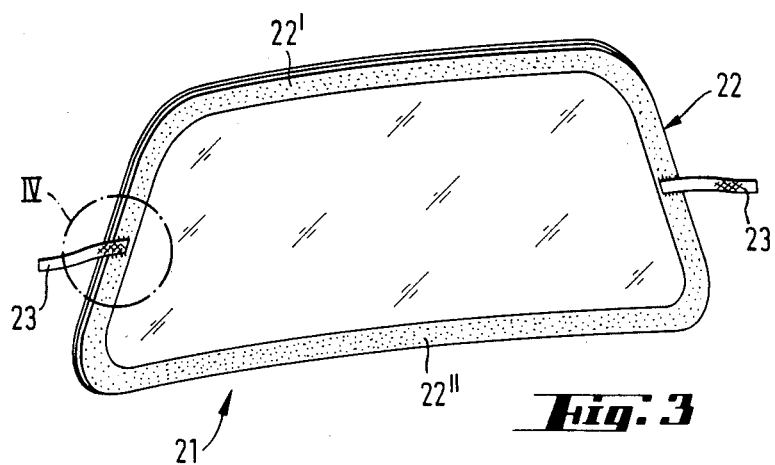
FIG. 3 is a perspective view of the windshield of the invention.
Figure 4:
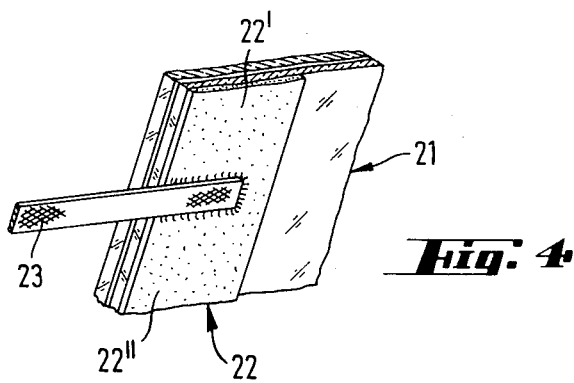
FIG. 4 is an enlarged view of a portion of FIG. 3, providing further detail.
Figure 5:
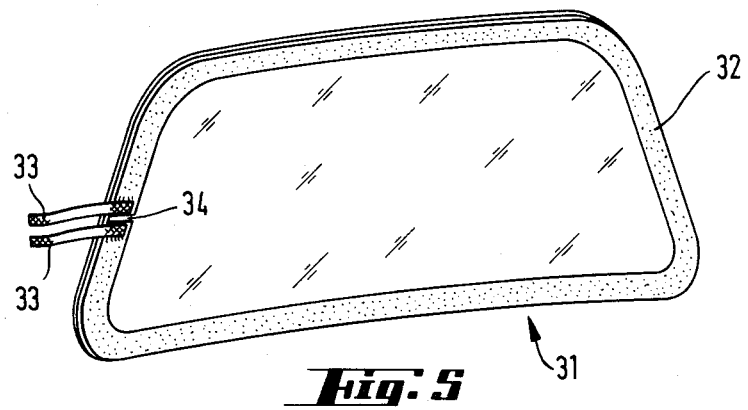
FIG. 5 is a perspective view of another form of the windshield of the invention.

A strip 15 of conductive material as may be seen to advantage in FIGS. 1 and 2 (the conductive strip is designated as conductive strip 22 in FIG. 3, conductive strip 32 in FIG. 5 and conductive strip 38 in FIG. 7) is disposed around or substantially around the marginal edges of the respective glass panes. The conductive strip, or so-called "maturing mass", consists of conductive metal, such as silver which may be applied to the glass pane in a variety of techniques. Thus, an electrically conductive baking paste, preferably a conductive silver paste, may be pressed on the surface of the glass pane by a silk-screen process as is typical in the production of electrically heated rear window panes. To this end, the conductive silver paste is burnt-in during the course of heat treatment required for bending and/or prestressing of the glass pane. In addition, the conductive paste may be melted onto the surface of the glass pane. Further, the conductive strip may be applied to the glass pane by other known metallizing processes, such as, for example, by a flame spraying or a vacuum metallizing process. Further still, the conductive strip may be applied mechanically, as will be discussed in connection with FIG. 7. According to all techniques, the conductive strip will be of a width along the marginal edge of approximately 1 to 2 cm.

A generator 20 providing a source of high frequency may be used in removal as well as in intallation of glass pane 1 according to one form of the invention. As illustrated in FIGS. 1 and 2, the strip 4 is dielectrically connected across the frequency generator, and because of dielectric losses within the adhesive the strip heats relatively quickly up to a point at which the adhesive, as pointed out, changes its characteristics in the desired manner so that that glass pane may be removed from the frame without great difficulty. In the circuit connection, the frequency generator is connected by wires 18, 19 to the circuit electrodes comprising conductive strip 15 and the body 2, respectively.

Referring to FIG. 3, a glass pane 21 is provided with a conductive strip 22. The conductive strip extends along the marginal edges in a completely closed loop fashion. A pair of connecting elements 23 for connection of the conductive strip to a source of current are secured to the conductive strip for direct heating by direct passage of current. The connecting elements may be flexible litz wires.

Each litz wire is connected to the conductive strip at substantially a median point of the vertical lateral edges of the glass pane. Thus, the conducting paths 22' and 22" will be of substantially the same length and heating will be substantially uniform throughout each of the sections of the conductive strip. The litz wires 23 may be secured to the conductive strip 22 of glass pane 21 during installation in any manner as may be conventional. Once the glass panel is in place, the litz wires may be accommodated in the space between the edge 5 of the glass pane and surface 6 of body 2 (see FIG. 2). The litz wires, however, are readily accessible after removal of the decorative strip 7 and may be connected to the power source for removal of the glass pane, if desired.

According to a specific but none limiting definition of the invention, referring to the form of glass pane of FIG. 3, the strand 4 providing the adhesive capability is formed of butyl rubber, and the conductive strip 22 is a strip of conductive silver pressure paste having a width measured from the edge of 20 mm. One conductive paste that has been used successfully in application by a silkscreen process pressed onto the glass pane is a paste sold by the firm Degussa, and identified No. 347E. The pressed on strip is allowed to dry and, then, burnt-in at a temperature of about 620° C. This step may be carried out in the course of bending the glass pane. The conductive strip has a mean thickness of 10 $\mu$m, a total length of 260 cm and a total resistance of about 0.4 ohm. The litz wires 23, may be soldered onto the conductive strip at the locations heretofore discussed.

The butyl rubber forming strand 4 is a commercially available material sold under the trade name TREMSHILD by the firm Tremco. The window pane subsequently to be removed was stored for a period of 7 days following installation of the body 2 of a vehicle. Following this period, the litz wires 23 are connected to a voltage source of 14 volts. Current of a value of 45 amps initially flows through the conductive strip, whereupon after heating, the current value drops to 40 amps. After 2 minutes, the conductive strip is heated to a temperature of 93° C., and after 3 minutes the temperature of the conductive strip is 104° C. The latter temperature was found adequate to plasticize the strand 4 of butyl rubber whereby the windshield was easily removed from the frame formed by rabbet 3 A suction apparatus (not shown) assisted in the removal operation.

The glass pane 31 of FIG. 5 is substantially similar to glass pane 21 of FIG. 3. According to the form of the invention of FIG. 5, the conductive strip 32 is not completely closed about the marginal edge of the glass pane and a pair of litz wires 33 are connected to the ends of the conductive strip at the interruption 34. The glass pane 31, as illustrated in FIG. 5, may be used for small windshields and with strands having a lower softening temperature.

A glass pane 1 of laminated safety glass, including a conductive strip 15, all as previously described with relation to FIGS. 1 and 2, may carry a strand 40 (see FIG. 6). The strand 40 is disposed on conductive strip 15 by any extrusion technique during the overall production of the glass pane. Preferably, either during extrusion of the strand or thereafter the strand is encased by a foil strip 36. The glass pane, thus, may be packaged and delivered to an automobile manufacturer. The foil strip is removed prior to installation of the glass pane.

A further variation of FIG. 6 may be seen in FIG. 7. In this variation the conductive strip comprises a metal foil strip or a flexible litz wire 38. A layer 39 of an adhesive provides a backing and an adhesive surface for adhering the metal foil to the glass pane. Suitable adhesives are known that may be activated by heat and/or pressure as may be experienced during the autoclave process of manufacture of the glass pane.

We claim:

1. A process for attaching a glass pane to a frame which comprises the steps of:
   (a) depositing a conductive material in strip form on the marginal edge of said glass pane;
   (b) attaching the conductive material onto the glass;
   (c) depositing a layer of thermoplastic adhesive between the glass pane and the frame;
   (d) connecting a source of electric power to the conductive strip; and
   (e) passing electric current through the conductive strip to heat the adhesive to its deformation temperature to bond the glass to the frame.

2. The process as in claim 1, characterized in that the conductive strip is connected as an electric resistance heater and is heated by the direct passage of current.

3. The process as in claim 1, characterized in that the conductive strip disposed along the edge of the glass pane provides a closed circuit, and the conductive strip is connected at at least two points providing substantially equal length paths for current.

4. The process according to claim 1, wherein the heat is generated by attaching one side of a source of high frequency electricity to the conductive strip and the other side of the soure of high frequency electricity to the frame, whereby the plasticization of the adhesive layer is accomplished by dioelectric heating.

5. The glass pane as in claim 4, characterized in that the conductive strip includes current connecting pieces in the form of flexible connecting litz wires.

6. The glass pane as in claim 5, characterized in that the conductive strip comprises a closed circuit and whereby the connecting litz wires are disposed on two opposite marginal edges thereby to subdivide the conductive strip into two substantially equal length sections.

7. The glass pane as in claim 5, characterized in that the conductive strip comprises an interrupted circuit and whereby the connecting litz wires are disposed at the ends of the circuit at either side of the interruption.

8. The glass pane as in claim 5 characterized in that the conductive strip consists of a metal foil band and including an adhesive layer for connection of the metal foil to the glass pane.

9. The glass pane as in claim 6 characterized in that the conductive strip consists of a flexible litz wire and including an adhesive layer for connection of the flexible litz wire to the glass pane.

10. The glass pane as in claim 5 characterized in that the conductive strip comprises a metal layer.

11. The glass pane as in claim 12 characterized in that the adhesive strand is disposed on the conductive strip.

* * * * *

UNITED STATES PATENT AND TRADEMARK OFFICE
CERTIFICATE OF CORRECTION

PATENT NO. : 4,555,607

DATED : November 26, 1985

INVENTOR(S) : PAUL ROENTGEN ET AL

It is certified that error appears in the above-identified patent and that said Letters Patent is hereby corrected as shown below:

Masthead, between paragraph [76] including the names and addresses of the inventors and paragraph [21] including the application number, include --[73] Assignee; Saint-Gobain Vitrage, Courbeboie, France--

Signed and Sealed this

Twenty-ninth Day of April 1986

[SEAL]

Attest:

DONALD J. QUIGG

Attesting Officer

Commissioner of Patents and Trademarks